(12) United States Patent  
Ritoniemi

(10) Patent No.: US 11,128,808 B2  
(45) Date of Patent: Sep. 21, 2021

(54) OVERHEAD SIDELIGHT

(71) Applicant: Procemex Oy, Jyväskylä (FI)

(72) Inventor: Jari Ritoniemi, Pirkkala (FI)

(73) Assignee: Procemex Oy, Jyväskylä (FI)

(\*) Notice: Subject to any disclaimer, the term of this patent is extended or adjusted under 35 U.S.C. 154(b) by 0 days.

(21) Appl. No.: 16/701,195

(22) Filed: Dec. 3, 2019

(65) Prior Publication Data

US 2020/0186696 A1    Jun. 11, 2020

(30) Foreign Application Priority Data

Dec. 10, 2018  (FI) .................................... 20186060

(51) Int. Cl.
| | |
|---|---|
| *H04N 5/235* | (2006.01) |
| *G06T 7/00* | (2017.01) |
| *G01N 21/89* | (2006.01) |
| *G01N 21/84* | (2006.01) |

(52) U.S. Cl.
CPC ....... *H04N 5/2354* (2013.01); *G01N 21/8901* (2013.01); *G01N 21/8914* (2013.01); *G06T 7/0004* (2013.01); *G01N 2021/8444* (2013.01); *G01N 2201/062* (2013.01); *G06T 2207/10152* (2013.01); *G06T 2207/30161* (2013.01)

(58) Field of Classification Search
CPC .......... G01N 21/8921; G01N 21/8901; G01N 21/8914; G01N 2021/8924; G01N 2201/062; G01N 2021/8444; G01N 2021/8917; G01N 2021/8908; G06T 7/0004; G06T 2207/30161; G06T 2207/10152; H04N 5/2354

See application file for complete search history.

(56) References Cited

U.S. PATENT DOCUMENTS

| | | | | |
|---|---|---|---|---|
| 3,513,321 A | * | 5/1970 | Sherman | G01B 5/0035 250/559.25 |
| 3,588,513 A | | 6/1971 | Akamatsu et al. | |
| 3,698,818 A | * | 10/1972 | Bowker | G01B 5/0035 356/639 |
| 3,806,253 A | * | 4/1974 | Denton | G01B 11/24 356/601 |
| 3,890,509 A | * | 6/1975 | Maxey | B27B 1/00 250/559.25 |

(Continued)

FOREIGN PATENT DOCUMENTS

| | | |
|---|---|---|
| CA | 2514788 A1 | 2/2006 |
| JP | S62293145 A | 12/1987 |

(Continued)

*Primary Examiner* — Sang H Nguyen  
(74) *Attorney, Agent, or Firm* — MacMillan, Sobanski & Todd, LLC

(57) ABSTRACT

The invention relates to a method for illuminating a wood fibre web for deviation detection. The method comprises turning on LEDs of an overhead sidelight that are side-directed towards a first edge of the web for illuminating a first half of width of the web, capturing an image of the first half, turning off the LEDs, turning on LEDs of the overhead sidelight that are side-directed towards a second edge of the web for illuminating a second half of width of the web, capturing an image of the second half, and turning off the LEDs. The invention also relates to an overhead sidelight, a machine vision system, and a lighting system.

14 Claims, 5 Drawing Sheets

(56) References Cited

U.S. PATENT DOCUMENTS

| | | | | |
|---|---|---|---|---|
| 4,196,648 A * | 4/1980 | Jones | .................... | B23D 45/105 144/357 |
| 4,308,461 A * | 12/1981 | Tuomaala | ............. | G01B 11/046 250/559.25 |
| 4,348,114 A | 9/1982 | Neale et al. | | |
| 4,541,722 A * | 9/1985 | Jenks | ....................... | B27B 1/007 250/559.43 |
| 5,212,539 A * | 5/1993 | Wogerbauer | ......... | G01B 11/046 356/627 |
| 5,254,859 A * | 10/1993 | Carman | ..................... | B27B 1/00 250/559.08 |
| 6,122,065 A * | 9/2000 | Gauthier | ................ | G01N 33/46 356/394 |
| 7,336,197 B2 * | 2/2008 | Ding | .................. | G06K 7/10722 235/462.42 |
| 8,374,498 B2 * | 2/2013 | Pastore | ................... | G03B 15/03 396/199 |
| 2003/0024301 A1 * | 2/2003 | Graeffe | .............. | G01B 11/0691 73/37.6 |
| 2004/0246473 A1 * | 12/2004 | Hermary | ............ | G01N 21/8986 356/237.1 |
| 2008/0074654 A1 * | 3/2008 | Taylor | ................ | G01N 21/8986 356/237.1 |
| 2008/0239287 A1 * | 10/2008 | Paavola | ............. | G01N 21/8986 356/73 |
| 2012/0257189 A1 * | 10/2012 | Haas | ........................ | G07D 7/12 356/51 |
| 2012/0262725 A1 * | 10/2012 | Barker | .................... | B27B 31/06 356/601 |
| 2013/0141115 A1 * | 6/2013 | Bourely | .................. | G01J 3/443 324/637 |
| 2015/0109615 A1 * | 4/2015 | Muller | ................... | G01B 11/24 356/138 |
| 2018/0164224 A1 | 6/2018 | Jiang | | |
| 2019/0049391 A1 | 2/2019 | Kleindorp | | |

FOREIGN PATENT DOCUMENTS

| | | |
|---|---|---|
| JP | H01253641 A | 10/1989 |
| WO | 2012049370 A1 | 4/2012 |
| WO | 2017042432 A1 | 3/2017 |
| WO | 2017191363 A1 | 11/2017 |

* cited by examiner

OVERHEAD SIDELIGHT

PRIORITY

This application claims priority of Finnish patent application number FI20186060 which was filed on 10 Dec. 2018, the contents of which are incorporated herein by reference.

FIELD OF THE INVENTION

The present invention relates to a sidelight for illuminating, for example, a continuous wood fibre web. The sidelight comprises an elongated body structure comprising several lights that are directed and arranged along the elongated body structure. The invention further relates to a method of utilizing the light, and a lighting system.

BACKGROUND

In continuous manufacturing processes, for example, paper, pulp and cardboard machines, there are materials or products constantly formed and moving through the machine in a continuous material web. In such processes, the product must be monitored in order to detect possible deviations, for example, holes, faults, wrinkles or streaks, and to obtain a final product of high quality, for example, by machine vision systems such as camera systems. And for monitoring the continuous material web has to be illuminated. A suitable illumination depends on deviations arranged to be detected, all deviations cannot be found by same kind of illumination or at least not so effectively. For example, in order to detect streaks or wrinkles from the web effectively a sidelight is commonly used for illumination. Sidelights are lighting devices that are arranged outside the web for illuminating the web from the side. However, it is not always possible to arrange lighting devices outside the web i.e. in the side of the web, because there is a lack of space.

SUMMARY

Now there has been invented an improved sidelight that is an overhead sidelight which solves the side space requirement problem in an efficient way. Various aspects of the invention include a lighting device, a lighting system, lighting method and a machine vision system comprising at least one sidelight and camera, and a computer readable medium comprising a computer program stored therein, which are characterized by what is stated in the independent claims. Various embodiments of the invention are disclosed in the dependent claims.

According to a first aspect of the invention, there is provided a method for illuminating a wood fibre web for deviation detection. The method comprises turning on LEDs of an overhead sidelight arranged above the wood fibre web, which LEDs are side-directed towards a first edge of the wood fibre web for illuminating a first half of width of the wood fibre web from center to the first edge of the wood fibre web, capturing an image of the first half of width of the wood fibre web by at least one imaging device, turning off the LEDs that are side-directed towards the first edge of the wood fibre web, turning on LEDs of the overhead sidelight, which LEDs are side-directed towards a second edge of the wood fibre web for illuminating a second half of width of the wood fibre web from center to the second edge of the wood fibre web, capturing an image of the second half of width of the wood fibre web by at least one imaging device, and turning off the LEDs that are side-directed towards the second edge of the wood fibre web.

According to an embodiment, the method further comprises turning on LEDs of a transmission light arranged underneath the wood fibre web, which LEDs are directed upwards for illuminating the whole width of the wood fibre web from below and through the web, capturing at least one image of the wood fibre web by at least one imaging device, and turning off the LEDs of the transmission light. According to an embodiment, the method further comprises transmitting image data of the captured image to an image data processing device for analysis. According to an embodiment, the method further comprises analysing the image data that is captured when the web is illuminated by the sidelight by using a sidelight type of monitoring profile. According to an embodiment, the method further comprises analysing the image data that is captured when the web is illuminated by the transmission light by using a transmission type of monitoring profile, wherein the sidelight type of monitoring profile and the transmission type of monitoring profile profiles have different parameters for monitoring.

According to a second aspect of the invention, there is provided an overhead sidelight arranged to be positioned over a food fibre web for illuminating the wood fibre web for imaging, comprising an elongated body arranged to support a plurality of LEDs, wherein a first part of the LEDs is side-directed towards a first edge of the wood fibre web for illuminating a first half of width of the wood fibre web from center to the first edge of the wood fibre web as a first part of the rectangular area and a second part of the LEDs is side-directed towards a second edge of the wood fibre web for illuminating a second half of width of the wood fibre web from center to the first edge of the wood fibre web as a second part of the rectangular area, and wherein the length of the elongated body is shorter or equal length than the width of the wood fibre web, and wherein the first and second part of the LEDs are on and off alternately.

According to an embodiment, a rectangular area is illuminated on the wood fibre web. According to an embodiment, a line is illuminated on the wood fibre web. According to an embodiment, for imaging, the angle between a center line of a light beam of a LED and the surface of the wood fibre web is 10° to 45°. According to an embodiment, the first part of the LEDs is arranged in the first half of the elongated body and the second part of the LEDs are arranged in the second half of the elongated body so that the center part of the elongated body comprises both the first and second part of the LEDs. According to an embodiment, in the center part every other LED is side-directed towards the first edge of the wood fibre web and every other is side-directed towards the second edge of the wood fibre web.

According to a third aspect of the invention, there is provided a lighting system for illuminating a wood fibre web for deviation detecting from a wood fibre web, wherein the lighting system comprises an elongated overhead sidelight disclosed above and an elongated transmission light, which overhead sidelight is arranged to be positioned over the web, perpendicular to the longitudinal direction of the web for illuminating a rectangular area on the surface of the web for image capturing in two parts, wherein a first part is illuminated when only the first part of LEDs that are side-directed towards the first edge of the wood fibre web are on, and a second part is illuminated when only the second part of LEDs that are side-directed towards the second edge of the wood fibre web are on, and which elongated transmission light is arranged to be positioned under the web perpendicular to the longitudinal direction of the web for illuminating the same area as the overhead sidelight, but through the web, and wherein the transmission light is arranged to be on, when the LEDs of the sidelight are turned off, for image capturing of the wood fibre web by the at least one imaging device.

According to an embodiment, turning on and off of LEDs is controlled by a lighting control unit by electric pulses through LED drivers of the LEDs.

According to a fourth aspect of the invention, there is provided a machine vision system for detecting deviations from a wood fibre web, wherein the machine vision system comprises an overhead sidelight disclosed above and at least one imaging device, wherein when the first part of the LEDs is side-directed towards the first edge of the wood fibre web are turned on and the second part of the LEDs is turned off, an image of the first half of width of the wood fibre web is arranged to be captured by the at least one imaging device, and wherein when the second part of the LEDs that are side-directed towards the second edge of the wood fibre web is turned on and the first part of the LEDs is turned off, an image of the second half of width of the wood fibre web is arranged to be captured by the at least one imaging device.

According to an embodiment, the system further comprises a transmission light arranged to be positioned under the web for illuminating the same area as the overhead sidelight, through the web, and wherein the transmission light is turned on, when the LEDs of the sidelight are turned off, and an image of the wood fibre web is arranged to be captured by the at least one imaging device. According to an embodiment, the at least one imaging device is arranged to transmit image data of the captured image to an image data processing device for analysis.

According to a fifth aspect of the invention, there is provided a computer program product embodied on a non-transitory computer readable medium, comprising computer program code configured to, when executed on at least one processor, cause a system to perform the method comprising turning on LEDs of an overhead sidelight arranged above the wood fibre web, which LEDs are side-directed towards the first edge of the wood fibre web for illuminating a first half of width of the wood fibre web from center to the first edge of the wood fibre web, capturing an image of the first half of width of the wood fibre web by an imaging device, turning off the LEDs that are side-directed towards the first edge of the wood fibre web, turning on LEDs of the overhead sidelight, which LEDs are side-directed towards the second edge of the wood fibre web for illuminating a second half of width of the wood fibre web from center to the second edge of the wood fibre web, capturing an image of the second half of width of the wood fibre web by an imaging device, and turning off the LEDs that are side-directed towards the second edge of the wood fibre web.

DESCRIPTION OF THE DRAWINGS

In the following, various embodiments of the invention will be described in more detail with reference to the appended drawings, in which.

DESCRIPTION OF EXAMPLE EMBODIMENTS

Figure 1A:
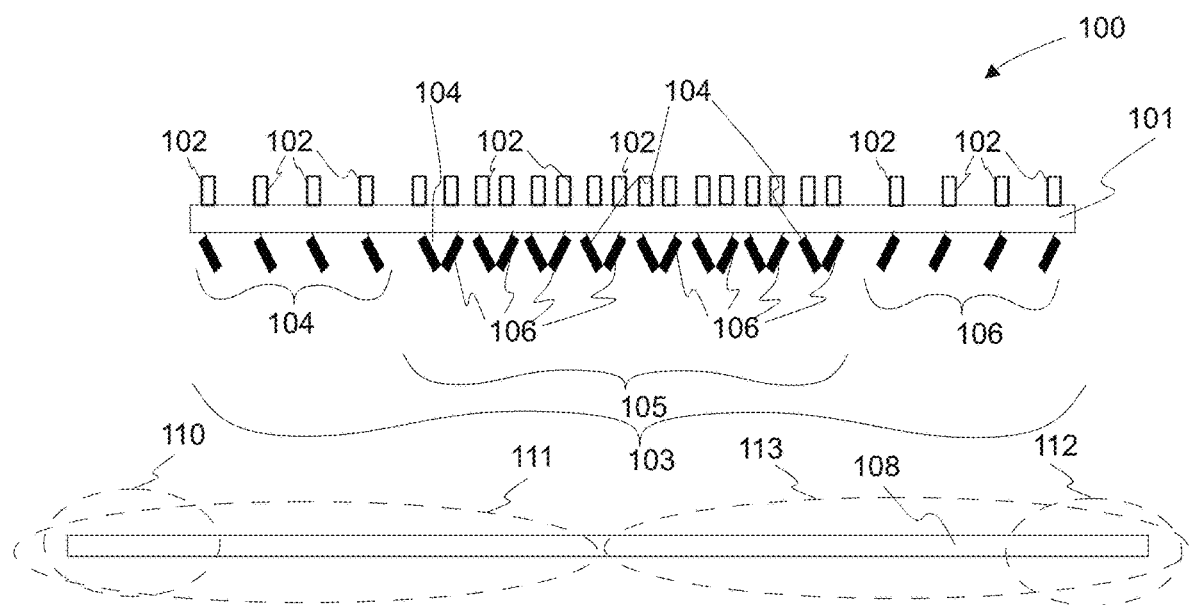
FIG. 1a shows an overhead sidelight according to an example embodiment.

The present invention relates to an overhead sidelight. The overhead sidelight is one type of reflection lights. Herein below, the overhead sidelight is also called just as a sidelight. The sidelight comprises a plurality of LED lights for illuminating an illumination area to a moving object in an angle. The illumination area may be a rectangular area having an elongated shape perpendicular to the longitudinal direction of the web. LEDs are arranged along an elongated body structure of the sidelight as LED modules. Each LED module comprises at least one LED board comprising at least one LED, but usually several LEDs, for example, 10-100, for example, 30 LEDs. However, the term "LED" is used herein for referring also to LED boards and LED modules. The elongated body of the sidelight may be made of any suitable material, for example, carbon fiber, aluminum, steel, etc. The sidelight is arranged to be positioned over a web arranged to be monitored. Therefore, the sidelight according to embodiments of the invention may be called as an overhead lighting device. The light emitting diodes, LEDs, may be, for example, High-Brightness LEDs. There may be a lens in front of a LEDs. Through the use of optics, the wide spread of light from the LED may be focused/turned through the lens to create a controlled, narrower beam angle. The sidelight comprises a light control unit for controlling turning the LEDs on and off.

The present invention also relates to a lighting system comprising at least a sidelight according to embodiments of the invention and a transmission light arranged to illuminate a wood fibre web underneath it. Further, the invention relates to a machine vision system comprising a sidelight according to embodiments of the invention and at least imaging device i.e. camera. The term "wood fibre" includes in this context any suitable wood fibre webs, for example, paper or cardboard webs. The imaging device is used for capturing images of a moving object i.e. a wood fibre web arranged to be monitored. Web imaging may be performed by using different monitoring profiles for different lightings in an image data processing device, whereto the captured image data is transmitted for analysis. By using different monitoring profiles for different lightings, different types of faults can be detected more effectively and detecting settings are adapted better to different lighting conditions.

In addition, in a method according to example embodiments of the invention a machine vision system comprising an overhead sidelight according to an embodiment of the invention and an imaging device is used for detecting deviations, for example, streaks and/or wrinkles, from a wood fibre web, for example, from a paper web.

An overhead sidelight according to example embodiments of the invention is arranged to be positioned above an imaging target, for example, above a moving web, for example, a wood fibre web, for example, a paper web that continuously moves underneath the sidelight in a horizontal position. The sidelight is arranged over the web so that the elongated side of the sidelight is perpendicular to the moving direction of the web. The LEDs are arranged along an elongated body structure of the lighting device supporting them underneath it. LEDs are arranged one next to the other. The length of the elongated body structure and thus the number of LEDs depends on the width of a web arranged to be monitored. The width of the sidelight is usually shorter than a width of a web, but it is also possible that they are as wide. But the idea is to keep the elongated body structure and thus the sidelight so short that no extra space is needed on the side or sides of the web.

The LEDs of a sidelight according to example embodiments are side-directed. It is also possible, that only part of them are side-directed. The LEDs are side-directed so that the sidelight effect is achieved. Side-directing means that each LED of the sidelight is directed so that directed light is not perpendicular to a surface underneath it, for example, a web, but it is angled. The angle between the center line of a light beam of a LED and the surface of the web is, for example, 10-45°. This kind of lighting angle is suitable when detecting streak and wrinkle deviations from the web by a camera. A first end of the elongated body structure of the sidelight comprises LEDs, which light beams are side-directed i.e. turned towards the first edge of the web, i.e. directed towards the first side of the web. And a second end of the elongated body structure of the sidelight comprises LEDs, which light beams are side-directed, turned, towards the second edge of the web, i.e. towards the second side of the web. Furthermore, the center part of the elongated body structure of the sidelight comprises both LEDs of the first part, which light beams are side-directed towards the first edge of the web, and LEDs of the second part, which light beams are side-directed towards the second edge of the web. Every other LED of the center part is side-directed towards the first edge and every other towards the second edge so that light beams of two adjacent LEDs are crosswise, i.e. they are directed in different sides, if they both are turned on. The LEDs of the first end and the LEDs of the second end are arranged to a certain distance from each other. There may be, for example, 7-15 cm, for example, 12 cm between two adjacent LEDs (i.e. LED modules). Thus, there is certain number of LEDS in a certain length of the sidelight structure. For example, if there are two LED boards in each LED module and each LED board comprises 30 LEDs, there may be a gap/space of 12 cm after every 60 LEDs. Whereas, the LEDs of the center part may be positioned more frequently than LEDs in the first and second ends. There may be, for example, a double number of LEDs in the certain length of the center part compared to the first and second ends. Both the first and the second end of the body structure may have a length, for example, around ¼ of the total length of the sidelight structure. Thus, the length of the center part may be, for example, around ½ of the total length.

The use, turning on and off, of LEDs may depend on their side-direction. When only an overhead sidelight is used for illumination, the illumination and image capturing may be phased in two parts and performed, for example, as follows: At a first phase, only the first part of LEDs that are side-directed towards the first side of the web are turned on and used for illuminating the web from the center of the web towards the first edge area of the web. During this first illumination the first side of the web is imaged, from the center to the edge. After imaging of the first side, the first part of LEDs is turned off. At second phase, for example, after 50-200 µs, for example, after 100 µs, from turning on the first part of LEDs, the second part of LEDs that are side-directed towards the second side of the web are turned on and used for illuminating the web from the center of the web towards the second edge area of the web. During this second illumination the second side of the web is imaged, from the center to the edge. After imaging of the second side, the second part of LEDs are turned off. Thus, every other image is illuminated with the first part of LEDs of the sidelight and image is captured from the first half of the web and every other image is illuminated with the second part of LEDs of the sidelight and image is captured from the second half of the web.

As an example, when looking at a sidelight from the direction whereto the web runs, the left end of the sidelight supports LEDs that are side-directed to the left, the right end of the sidelight supports LEDs that are side-directed to the right and the center part support LEDS, which every other LED is side-directed to the left and every other to the right. And center lines of all light beams of LEDs have an angle of around 33° to the surface of the web.

By an overhead sidelight according to the example embodiments of the invention the whole width of the web can be illuminated one half at the time so that detecting of streaks or wrinkles or other faults is more effective without a lighting device/s that has/have to be positioned to the side of the web, for example, an area outside a web. Furthermore, the overhead sidelight according to the example embodiments of the invention provides flatter light than a regular sidelight arranged to the side of the web. In addition to that, the overhead sidelight according to the example embodiments of the invention provides less scattered light compared to regular side lights arranged to the side of the web.

In the lighting system, in addition to an overhead sidelight, at least one transmission light is arranged to illuminate the web, but from below and it is called as a transmission light and it may also be called as a through light, because the light passes through the paper when imaged. Use of one or more transmission light may aid detection of other kind of deviations i.e. other than streaks and wrinkles. It may be used, for example, for detecting cloudiness, dirt particles and holes in mass of a web. An overhead sidelight and a transmission light may be arranged at the same line, but on different sides of the web so that they both illuminate the same rectangular area of web, which is also imaged by cameras. The transmission light may comprise a plurality of light sources, for example, a plurality of regular LEDs. Instead of or in addition to a transmission light, it is possible to also use one or more reflection lights in the lighting system.

The use of light sources for illuminating a web may alternate, for example, so that every other captured image is illuminated with LEDs of an overhead sidelight (in two phases) and every other captured image is illuminated with the transmission light (third phase). The illumination alternation and image capturing may thus be performed, for example, as follows: In the first phase, a first image capturing is illuminated by the LEDs of the sidelight directed to a first side, and in the second phase, a second image capturing is illuminated by the LEDs directed to a second side, and together these images form a sidelight illuminated image. In the third phase, the web is illuminated with the transmission light and a transmission light illuminated image is captured. After the transmission light illumination, the sidelight is again used for illuminating. In other words, a part of the captured images, ½ of images, are illuminated with the overhead sidelight and the other part, ½ of images, with transmission light. Instead or in addition of the transmission light, it is possible to use one or more reflection lights other than the overhead sidelight. However, it is possible to illuminate the web by using any suitable lighting sequences.

An imaging device used for capturing images and being a part of machine vision system according to embodiments of the invention may be a so-called smart camera comprising an image data processing device part that is arranged to analyse captured images. The image data processing device part may comprise at least one processor, at least one memory including computer program code for one or more program units and means for transferring trigger signals or captured image data wirelessly or via wired connection, for example, a transmitter or a transceiver. There may be multiple processors e.g. a general-purpose processor and/or a graphics processor and/or a DSP processor and/or a FPGA and/or multiple different memories e.g. volatile memory for storing data and programs at run-time and non-volatile memory like a hard disk for permanently storing data and programs. The image data processing device part of the imaging device may be any computing device suitable for handling image data such as a computer. The imaging device may also include a video controller and an audio controller for generating signals that can be produced to the user with computer accessories. The smart camera produces output to the user through output means. The video controller may be connected to a display. The display may be e.g. a flat panel display or a projector. The audio controller may be connected to a sound source such as loudspeakers or earphones.

The external image data processing device may be a part of the machine vision system according to embodiments of the invention, but it is not an integrated part of an imaging device. The external image data processing device comprises at least one processor, at least one memory including computer program code for one or more program units and means for receiving image data wirelessly or via wired connection, for example, a receiver or a transceiver and means for transferring trigger signals or image data wirelessly or via wired connection, for example, a transmitter or a transceiver. There may be multiple processors e.g. a general-purpose processor and/or a graphics processor and/or a DSP processor and/or FPGA and/or multiple different memories e.g. volatile memory for storing data and programs at run-time and nonvolatile memory like a hard disk for permanently storing data and programs. The image data processing device may be any computing device suitable for handling image data such as a computer. The connection between an imaging devise and the external image data processing device may be a wired or wireless network. The image data processing device may also include a video controller and an audio controller for generating signals that can be produced to the user with computer accessories. The simulator produces output to the user through output means. The video controller may be connected to a display. The display may be e.g. a flat panel display or a projector. The audio controller may be connected to a sound source such as loudspeakers or earphones.

The image data processing device part and/or the external image data processing device may analyse the received image data and if the image data processing device part or the external image data processing device detects a streak or other deviation determined to be detected, the image data processing device part or the external image data processing device may store this information indicating about the streak or fault to a defect map or in connection with statistics.

A light control unit may be arranged to control turning lights on and off, for example, the LEDs of a sidelight and transmission light. The light control unit controls the LEDs by electric impulses by putting them on and off. The light control unit may be an integrated or external part (electrically connected to the sidelight and the imaging device) of an imaging device or an integrated or external part of the sidelight. The light control unit may comprise at least one processor, at least one Field-programmable gate array (FPGA), at least one memory including computer program code for one or more program units and means for transferring signal data wirelessly or via wired connection, for example, a transmitter or a transceiver, for turning on and off the LEDs. There may be one or more processors e.g. a general-purpose processor and a DSP processor and/or multiple different memories e.g. volatile memory for storing data and programs at run-time and non-volatile memory like a hard disk for permanently storing data and programs.

In the following, several embodiments of the invention will be described in the context of figures. It is to be noted, however, that the invention is not limited to shown embodiments, but the embodiments may also be combined, when applicable. Different embodiments may have applications in any environment where side-lighting is required.

FIG. 1a shows an overhead sidelight 100 according to an example embodiment. The overhead sidelight 100 is arranged to be positioned over a food fibre web 108 perpendicularly with respect to the running direction of the web 108 for illuminating a rectangular area to the wood fibre web half of the rectangular area at the time i.e. in two phases. The overhead sidelight 100 comprises an elongated body 101 arranged to support a plurality of LEDs 103 that are controlled by a lighting control unit (not shown) by electric impulses by putting a first and second part of the LEDs 103 on and off alternately. The lighting control unit is electrically connected to LEDs 103. The first part 104 of the LEDs 103 are side-directed towards a first edge 110 of the wood fibre web 108 and arranged to illuminate at least approximately a first half 111 of the width of the wood fibre web 108, from center to the first edge 110 as a first part of an illumination area. The first part 104 of the LEDs 103 are arranged in an area that is a first half of the elongated body 103. There is a LED driver 102 between LEDs and the lighting control unit, for example, more specifically between each LED board and the lighting control unit, for controlling LEDs. The LED driver 102 is controlled by the lighting control unit.

A second part 106 of the LEDs 103 are side-directed towards a second edge 112 of the wood fibre web 108 and arranged to illuminate at least approximately a second half 113 of the width of the wood fibre web 108, from center to the second edge 112 as a second part of an illumination area. The second part 106 of the LEDs 103 are arranged in an area that is the second half of the elongated body 101. The elongated body 101 has in this example a length that is approximately equal with the width of the wood fibre web 108, but it may also be shorter or a bit longer.

As said above, the first part 104 of the LEDs 103 are arranged in the first half of the elongated body 101 and the second part 106 of the LEDs 103 are arranged in the second half of the elongated body 101, but the center part 105 of the elongated body 101 comprises both the LEDs 103 from the first part 104 and second part 106. In the center part 105 every other LED 103 is side-directed towards the first edge 110 i.e. they belong to the first part 104 of the LEDs 103 and every other LED 103 is side-directed towards the second edge 112 i.e. they belong to the second part 106 of the LEDs 103.

Figure 1B:
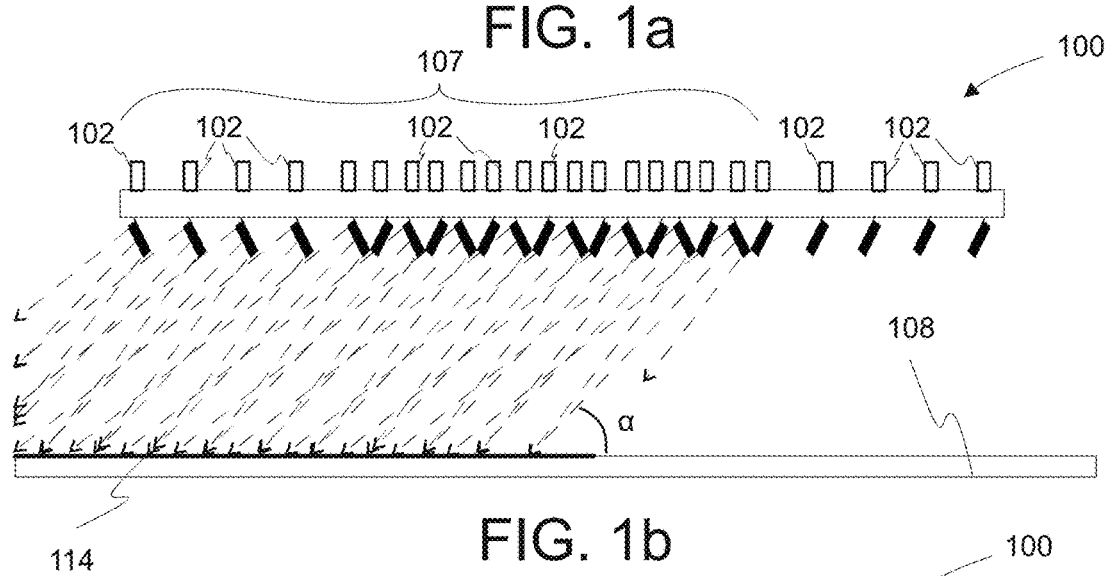
FIG. 1b-c show use examples of the sidelight of FIG. 1a according to an example embodiment.
Figure 1C:
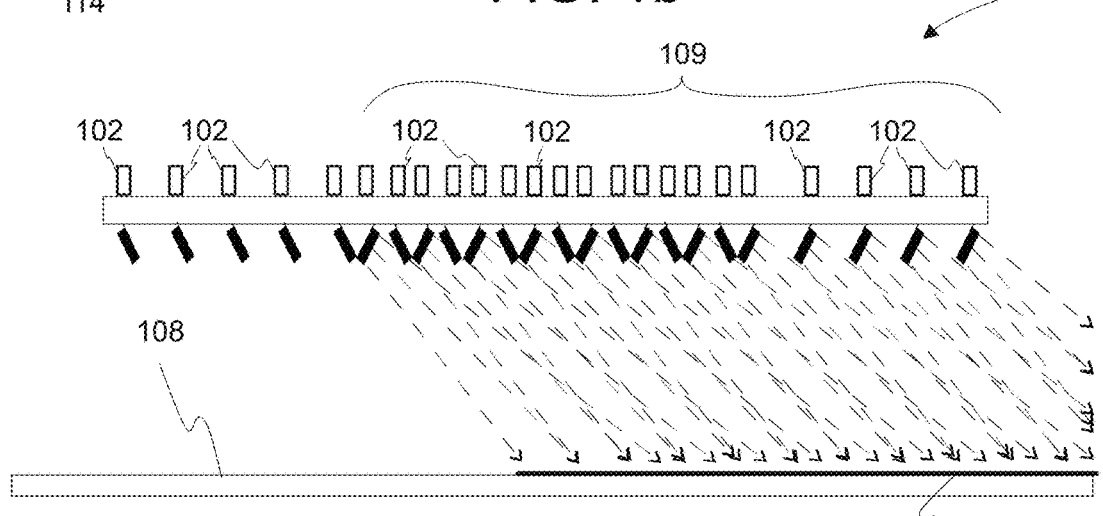

FIGS. 1b and 1c show the sidelight of FIG. 1a in on-states used for illuminating a rectangular area to the web 108, a half area at the time. FIG. 1b shows a situation, when the first part 104 of the LEDs 103 are turned on and the second part 106 of the LEDs 103 is turned off. As can be seen from FIG. 1b, approximately a first half of the width of the web 108 is illuminated. And as can also be seen, the light beams of LEDs 108 have an angle α when directed to the surface of the web 108. The angle α between a center line of a light beam produced by LED 103 and the surface of the wood fibre web 108 is 33°. However, the angle α may also be arranged bigger, for example, 34°, 35°, 36°, 37° or even bigger, for example, 38-45° or it may be arranged smaller, for example, 32°, 31°, 30°, 29° or 28-10°.

FIG. 1c shows a situation, wherein the second part 106 of the LEDs 103 is turned on and the first part 104 of the LEDs 103 is turned off. As can be seen from FIG. 1c, approximately a second half of the width of the web 108 is illuminated by the second part of the illumination area 115.

The light control unit controls the LEDs 103 by electric impulses by putting the first part 104 of the LEDs 103 and the second part 106 of the LEDs 103 on alternately trough the LED drivers 102. When the first part 104 of the LEDs 103 are turned on and the second part 106 of the LEDs 103 is turned off, the area of the first part of the illumination area 114 is arranged to be imaged by at least one imaging device. Whereas, when the second part 106 of the LEDs 103 are turned on and the first part 104 of the LEDs 103 is turned off, the area of the second part of the illumination area 115 is arranged to be imaged by at least one imaging device, which at least one imaging device may be the same or different than at least one imaging device used for imaging the first part of the illumination area 114.

When comparing FIGS. 1b and 1c, the difference between the directed lights of the first part 104 and the second part 106 of the LEDs 103 can be seen.

Figure 2A:
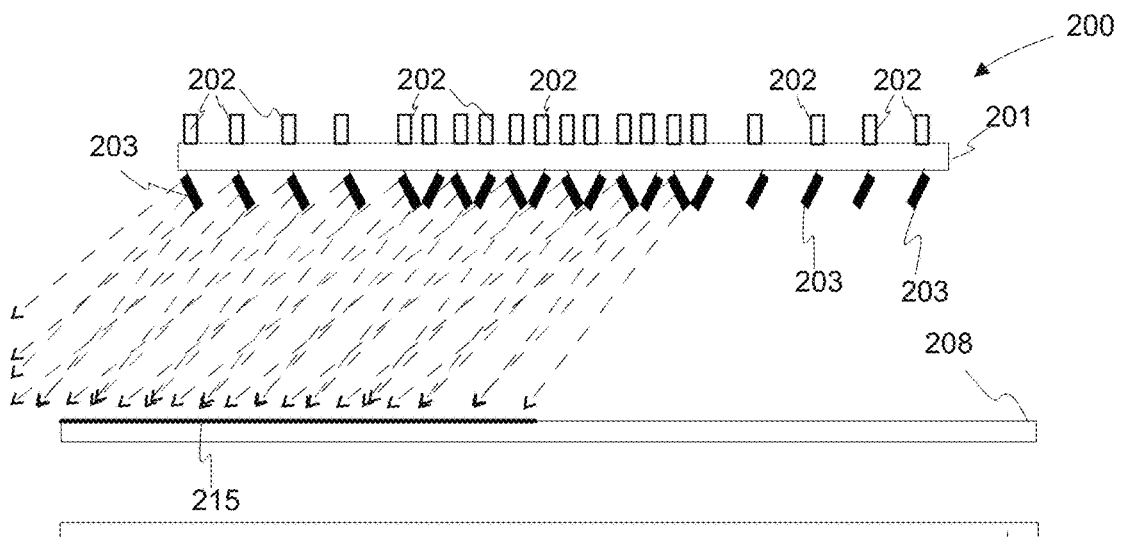
FIG. 2a-c show use examples of a lighting system according to an example embodiment.
Figure 2B:
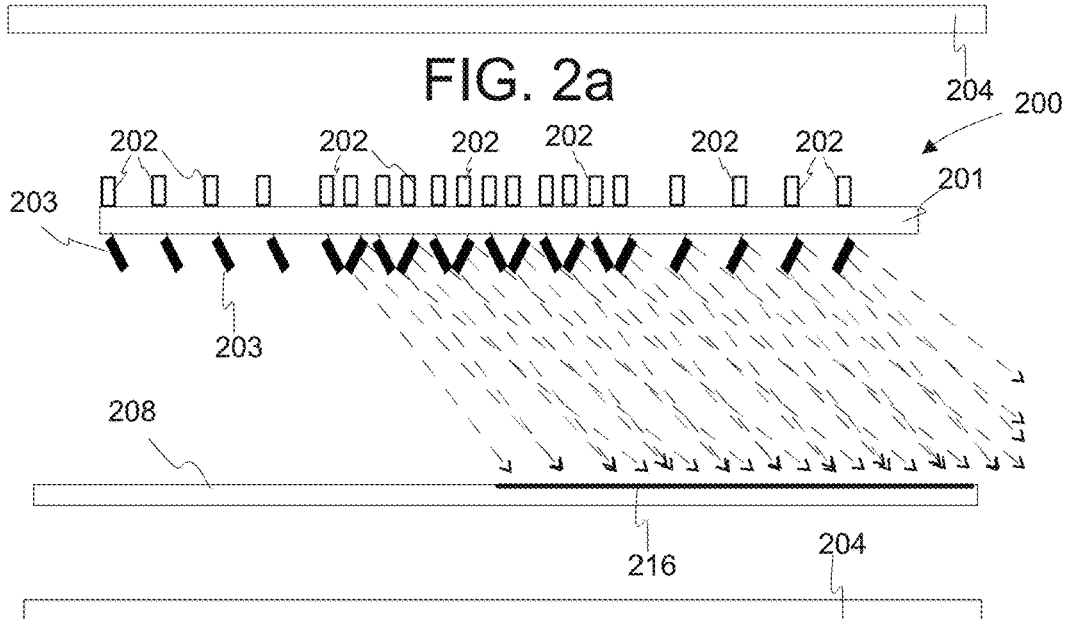
Figure 2C:
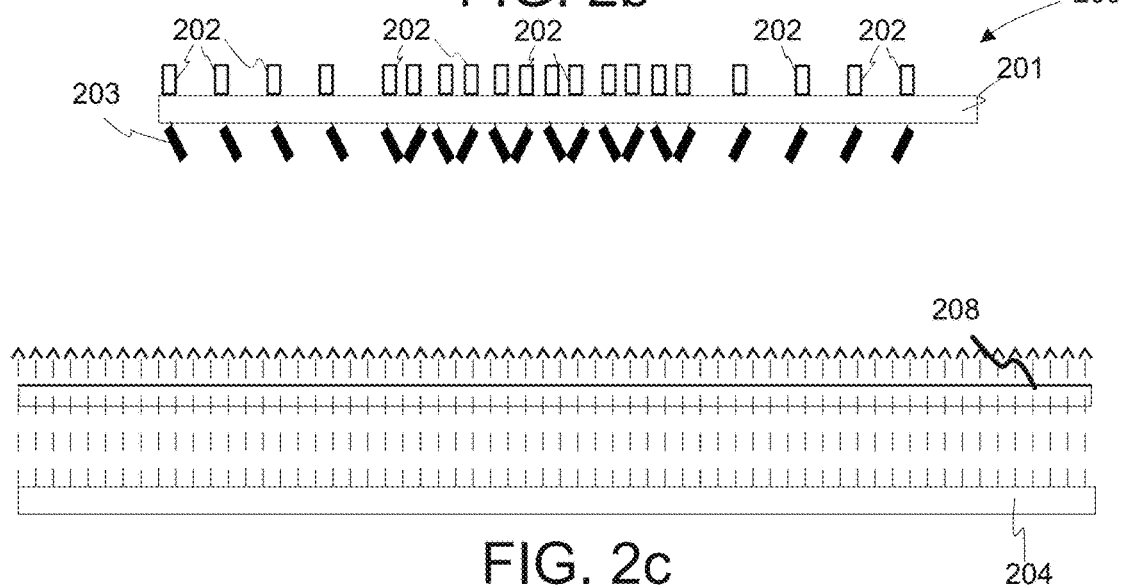

FIGS. 2a-c show a lighting system 200 in a use-state according to an example embodiment. The lighting system 200 comprises a sidelight 201 over a food fibre web 208 and it is arranged to provide an illumination rectangular area on the surface of the web 208. The lighting system 200 further comprises a transmission light 204 comprising also a plurality of LEDs and their LED drivers (not shown) and arranged to be positioned under the web 208 for illuminating an illumination rectangular area upwards to the surface of the web. The illumination areas of the overhead sidelight 201 and the transmission light 204 are arranged to form approximately to the same line on the web 208, but overhead sidelight 201 is illuminating its area in two parts, one half at the time and the transmission light 204 in one part, the whole width of the web 208 is illuminated at once, but the imaging may be performed in two parts, one side at the time. However, it is also possible that the transmission light 204 illuminates the area of the web in two parts, one half at the time and that the imaging is also performed in two parts, one half of the web 208 at the time.

FIG. 2a shows a situation example, wherein a first part of the LEDs 203 is turned on and a second part of the LEDs 203 and LEDs of the transmission light 204 are turned off. As can be seen from FIG. 2a, again approximately a first half of the width of the web 208 is illuminated by a first part of the illumination area 215. An image of the first half of the wood fibre web 208 may now be captured by the at least one imaging device (not shown).

In FIG. 2b is shown a situation example, wherein the second part of the LEDs 203 is turned on and the first part of the LEDs 203 and LEDs of the transmission light 204 are turned off. In FIG. 2b, again approximately a second half of the width of the web 208 is illuminated by a second part of the illumination area 216. An image of the second half of the wood fibre web 208 may now be captured by the at least one imaging device (not shown).

In FIG. 2c, the transmission light 204 is turned on, and the LEDs 203 of the sidelight 201 are turned off and the light produced by the transmission light 204 directs through the web 208 and the illumination area of the whole width 210 forms on the surface of the web 208, the whole width at the time or in two parts. An image of the whole width of the wood fibre web 208 may now be captured by the at least one imaging device (not shown) at the time or in two parts.

A light control unit is electrically connected to LED drivers 202 of the sidelight 201 and the LED drivers of the transmission light 204 for controlling the LEDs 203 of the sidelight 201 and LEDs of the transmission light 204 by electric impulses by turning them on and off. The order or frequency of putting them on or the on-time period may vary, and it may depend, for example, on the web or other monitoring target or used monitoring method/profile. Web imaging may be performed by using different monitoring profiles for different lightings. This way different types of deviations can be detected more effectively and monitoring and/or detecting settings are adapted better to different lighting conditions. For example, there may be different monitoring profiles for images captured using sidelight and transmission light illuminations, wherein the profiles have/use different parameters for monitoring.

Figure 3A:
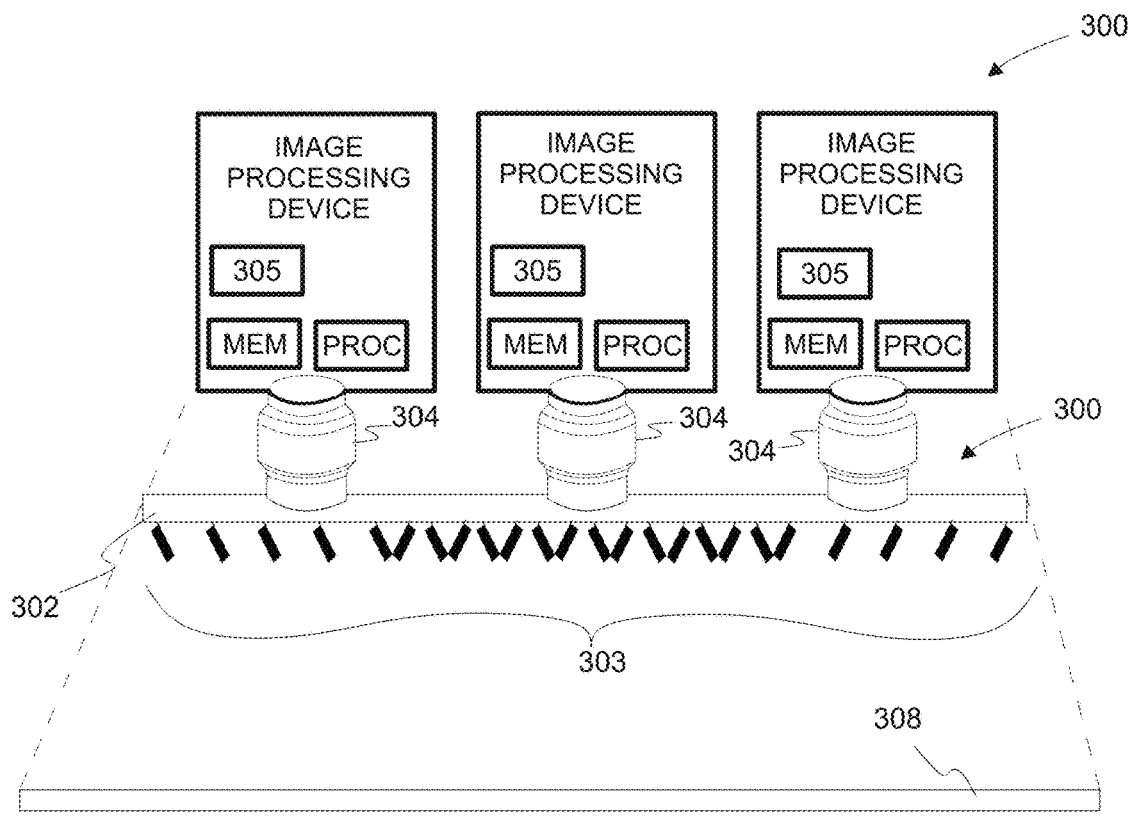
FIG. 3a-b show a machine vision system comprising an overhead sidelight according to an example embodiment.
Figure 3B:
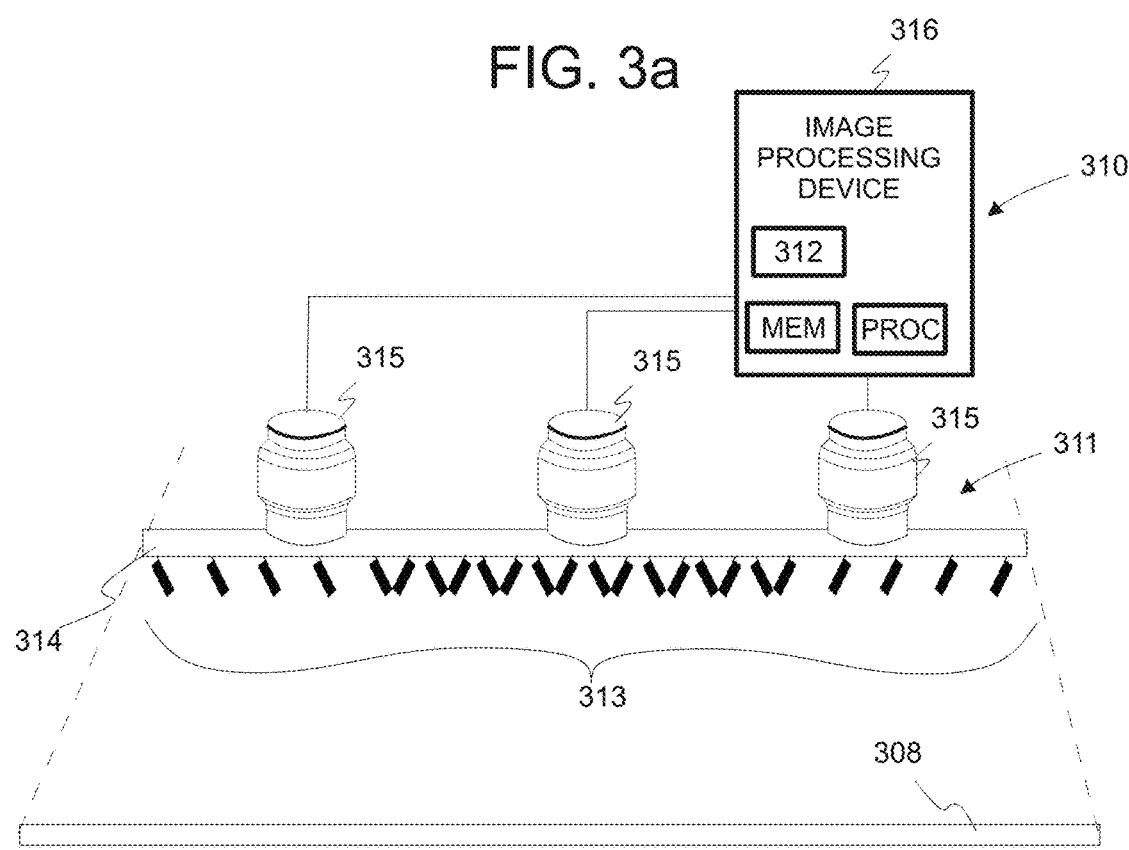

FIGS. 3a-b show a machine vision system according to an example embodiment. The machine vision system 300 of FIG. 3a comprises an overhead sidelight 301 and three smart cameras 304 that are all arranged over a web 308. The overhead sidelight 301 comprises an elongate body 302 and a plurality of LEDs 303, which elongate body 302 supports LEDs 303. The smart cameras 304 comprises a light control unit 305. The light control unit 305 is an integrated part of cameras 304, but it may also be a separate device. The smart cameras 304 are arranged to capture images of rectangular areas illuminated by LEDs 303. Each smart camera 304 comprises an image processing unit for analysing the image data as an integrated part. There is also a LED driver (not shown) between LEDs 303 and the lighting control unit 305 for controlling LEDs. LED drivers are controlled by lighting control units 305.

The machine vision system 310 of FIG. 3b comprises an overhead sidelight 311 and three cameras 315 that are arranged over a web 308 and an image processing device 316 arranged to analyse the image data transmitted by the cameras 315. The overhead sidelight 311 comprises an elongate body 314 and a plurality of LEDs 313, which elongate body 314 supports LEDs 313. The image processing device 316 comprises a light control unit 312. The light control unit 312 is electrically connected to LEDs 303 and cameras 315. The light control unit 312 is in this example embodiment fixed to the elongate body 314, but it may also be a separate device. The cameras 315 are arranged to image rectangular areas illuminated by LEDs 303. Each camera 325 is connected to the image processing device 316.

The light control unit 305, 312 controls the LEDs 303 by electric impulses by putting a first part of the LEDs 303, 313 that are side-directed to a first direction and the second part of the LEDs 303, 313 that are side-directed to a second direction on and off alternately. However, it is also possible that a light control unit is a part of a side light instead a part of a camera of image processing device.

The light control unit 305, 312 controls also image capturing timing of the at least one camera 304, 315 by electric impulses, for example, for capturing images when a field of view of a camera 304, 315 comprises an illuminated area.

When the first part of the LEDs 303, 313 are turned on and the second part of the LEDs 303, 313 is turned off, an illuminated rectangular area provided by the first part of LEDs 303, 313 is imaged. Whereas, when the second part of the LEDs 303 are turned on and the first part of the LEDs 303 is turned off, an illuminated rectangular area provided by the second part of LEDs 303, 313 is imaged.

Figure 4:
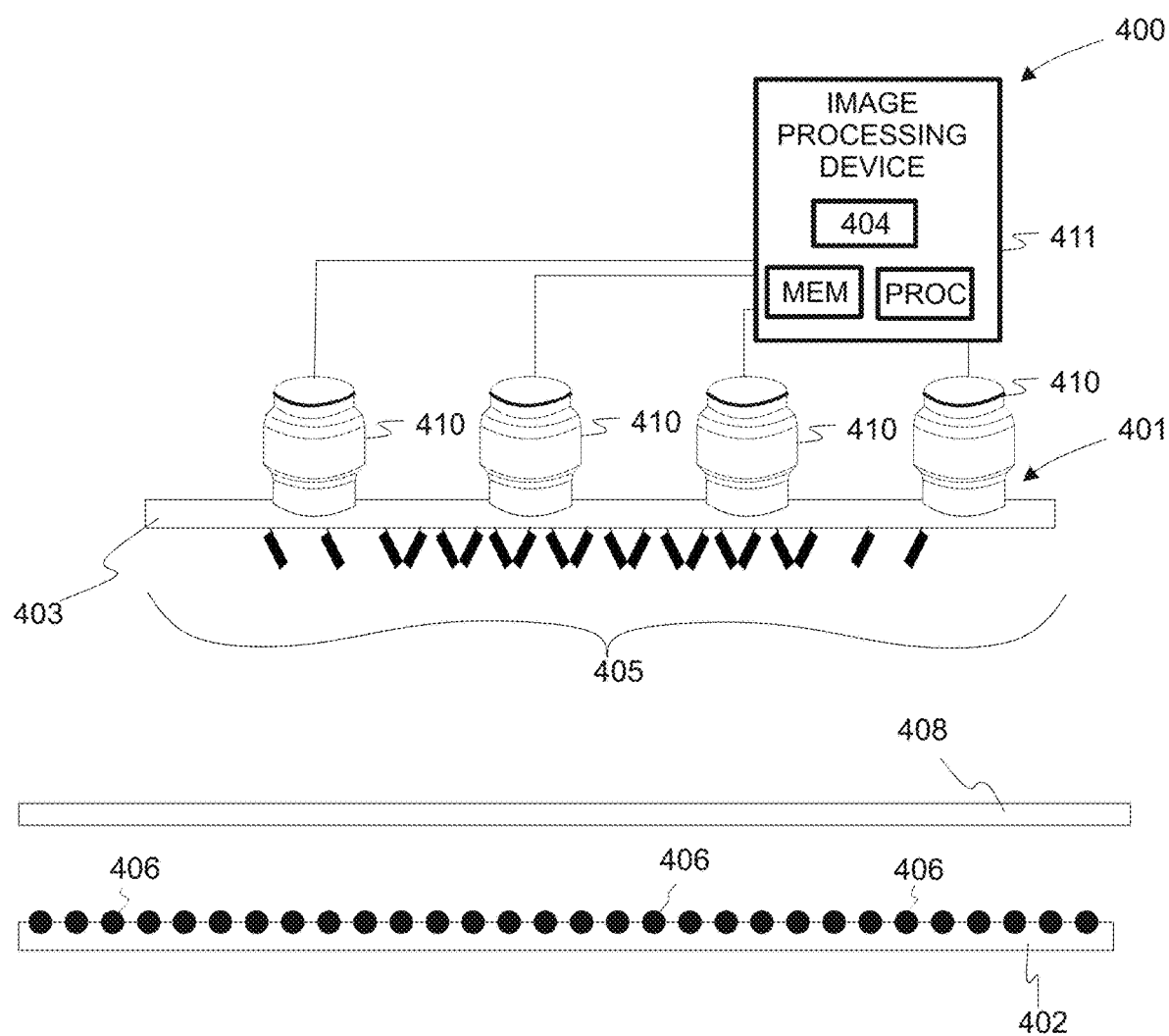
FIG. 4 shows a machine vision system comprising an overhead sidelight and a transmission light according to an example embodiment.

FIG. 4 shows a machine vision system 400 according to an example embodiment. The machine vision system 400 comprises an overhead sidelight 401, a transmission light 402 and four cameras 410 that are connected to an image processing device 411 arranged to analyse image data captured by the cameras 410.

The overhead sidelight 401 is arranged to be positioned over a wood fibre web 408 perpendicularly with respect to the running direction of the web 408 i.e. perpendicular to the longitudinal direction of the web 408 for illuminating a rectangular area to the wood fibre web 408, half of the area at the time. The overhead sidelight 401 comprises an elongated body 403 arranged to support a plurality of LEDs 405. A first part, a half of LEDs, of the plurality of LEDs 405 are side-directed to a first direction and a second part, a half of LEDs, of the plurality of LEDs 405 are side-directed to a second direction. A first end of the elongated body 403 comprises LEDs of the first part of LEDs 405, the second end of the elongated body 403 comprises LEDs of the second part of LEDs 405, and a center part of the elongated body comprises LEDs of the first and second parts of LEDs 405 so that every other LED is a LED of the first part and every other is a LED of the second part. A lighting control unit 404 of the image processing device 411 is configured to control the LEDs 405 through LED drivers (not shown) by electric impulses by turning the first and second part of the LEDs 405 on and off at different times. The lighting control unit 404 is electrically connected to LEDs drivers.

The transmission light 402 comprises also a plurality of LEDs 406. The transmission light 402 is arranged to be positioned under the web 408 for illuminating an illumination area upwards to the surface of the web 408, through the web 408. The illumination areas provided by the overhead sidelight 401 and the transmission light 402 are formed approximately to the same part on the web 408, the overhead sidelight 401 is illuminating its area in two parts (also imaged in two parts), one half at the time, and the transmission light 402 illuminates the whole rectangular area at once and the area is imaged at once or in two parts or the transmission light 402 illuminates the area in two parts and the area is imaged in two parts.

The lighting control unit 404 is arranged to control also the LEDs 406 of the transmission light 402 through LED drivers of the transmission light 402 (not shown) by electric impulses by turning the LEDs 406 on at different times than LEDs 405 of the sidelight 401. The lighting control unit 404 is electrically connected to LEDs drivers of the transmission light 402.

The cameras 410 are also controlled by the lighting control unit 404 to capture images of illuminated areas. For example, when the first part of LEDs 405 is on (other LEDs are off), one or more cameras 410 are configured to capture at least one image of the illuminated area, transmit the captured image data to the image processing device 411 for analysis. And when the second part of LEDs 405 are on (other LEDs are off), one or more cameras 410 are configured to capture at least one image of the illuminated area. Both images comprise a part of the area provided by the sidelight 401, in two parts, and the captured image data to the image processing device 411 for analysis. Image data analysis for the sidelight images may be performed by using a sidelight type of monitoring profile. Whereas, when the LEDs 406 of the transmission light 402 are on (other LEDs are off), one or more cameras 410 are configured to capture at least one image of the illuminated area and transmit the captured image data to the image processing device 411 for analysis. Analysis may be performed by using a transmission light type of monitoring profile for detecting deviations. The transmission light type of monitoring profile may be configured to be suitable for detecting cloudiness, dirt particles and holes in the web.

By different type of profiles, wherein the type depends on lighting conditions, different types of deviations can be detected easier and higher quality for the web 408 can be achieved.

As can be seen from FIG. 4, it is possible that there are no LEDs in the end areas of the overhead sidelight 401. Because the LEDs are side-directed, the whole width of the web 408 could still be illuminated.

Figure 5:
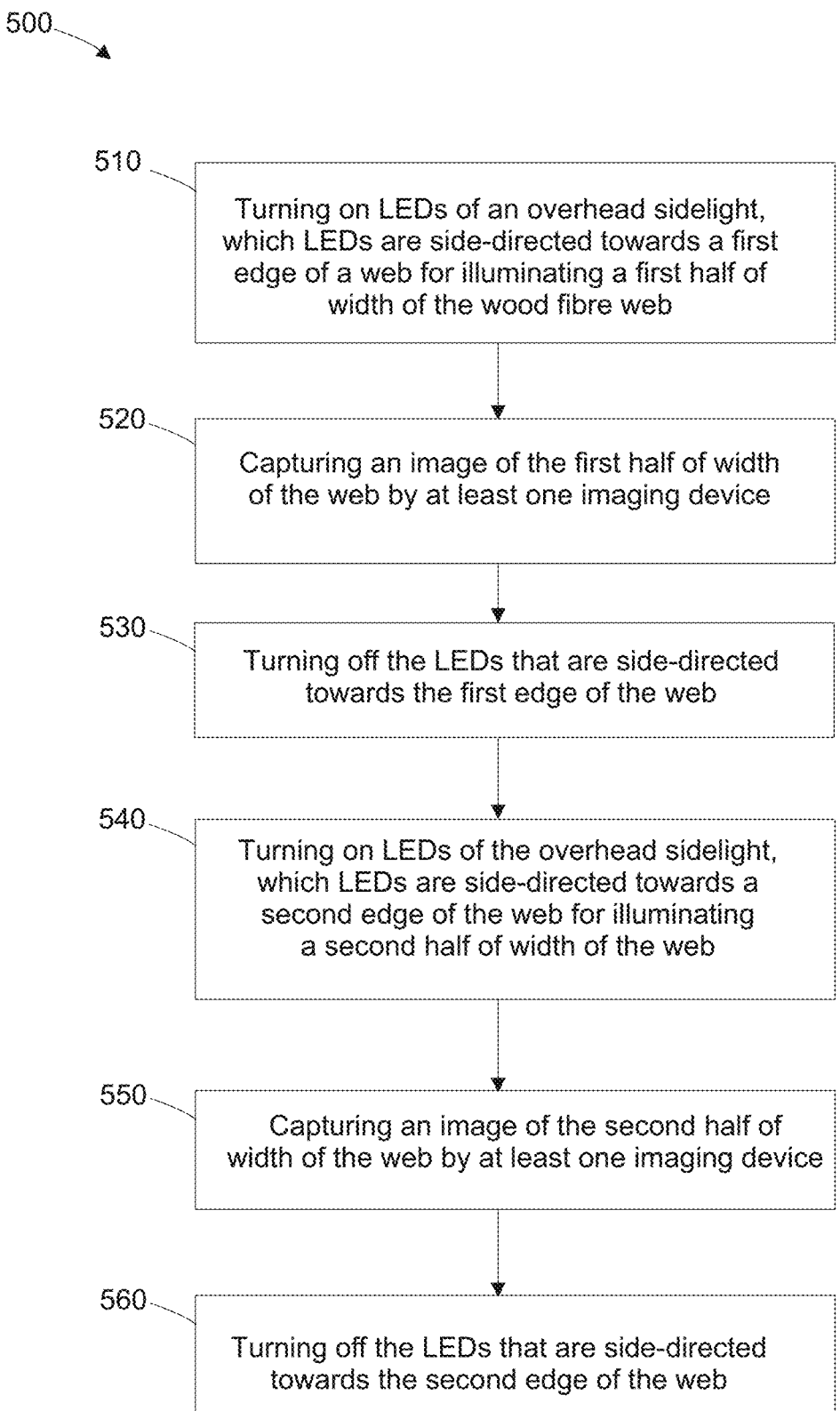
FIG. 5 shows a flow chart of a method for illuminating a wood fibre web for deviation detection by a machine vision system comprising a sidelight according to an embodiment of the invention.

FIG. 5 shows a flow chart of a method for illuminating a wood fibre web for deviation detection by a machine vision system 500 comprising a sidelight according to an embodiment of the invention. In step 510, LEDs of an overhead sidelight arranged above the wood fibre web are turned on. These LEDs are side-directed towards a first edge of the wood fibre web for illuminating a first half of width of the wood fibre web from center to the first edge of the wood fibre web. In step 520, an image of the first half of width of the wood fibre web is captured by at least one imaging device. In step 530, the LEDs that are side-directed towards the first edge of the wood fibre web are turned off. In step 540, LEDs of the overhead sidelight are turned on. These LEDs are side-directed towards a second edge of the wood fibre web for illuminating a second half of width of the wood fibre web from center to the second edge of the wood fibre web. In step 550, an image of the second half of width of the wood fibre web is captured by at least one imaging device. And in step 560, the LEDs that are side-directed towards the second edge of the wood fibre web are turned off.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A one overhead sidelight illuminating method for illuminating a paper or cardboard web for deviation detection, comprising:
   turning on LEDs of the overhead sidelight arranged above the web, which width of the overhead sidelight is shorter than a width of the web or as wide as the web, and which LEDs are side-directed towards a first edge of the web when looking at the sidelight from the direction whereto the paper or cardboard web runs for illuminating a first half of width of the web from center to the first edge of the web for capturing an image of the first half of width of the web by at least one imaging device;

turning off the LEDs that are side-directed towards the first edge of the web; turning on LEDs of the same overhead sidelight, which LEDs are side-directed towards a second edge of the web when looking at the sidelight from the direction whereto the paper or cardboard web runs for illuminating a second half of width of the web from center to the second edge of the web for capturing an image of the second half of width of the web by at least one imaging device; and turning off the LEDs that are side-directed towards the second edge of the web.

2. The method according to claim 1, wherein the method further comprises; turning on LEDs of a transmission light arranged underneath the web, which LEDs are directed upwards for illuminating the whole width of the web from below and through the web; capturing at least one image of the web by at least one imaging device; and turning off the LEDs of the transmission light.

3. The method according to claim 1, wherein the method further comprises; transmitting image data of the captured image to an image data processing device for analysis.

4. The method according to claim 3, wherein the method further comprises: analysing the image data that is captured when the web is illuminated by the sidelight by using a sidelight type of monitoring profile.

5. A one overhead sidelight illuminating method for illumination a paper or cardboard web for deviation detection, comprising:

turning on LEDs of the overhead sidelight arranged above the web, which width of the overhead sidelight is shorter than a width of the web or as wide as the web, and which LEDs are side-directed towards a first edge of the web when looking at the sidelight from the direction whereto the paper or cardboard web runs for illuminating a first half of width of the web from center to the first edge of the web for capturing an image of the first half of width of the web by at least one imaging device;

turning off the LEDs that are side-directed towards the first edge of the web: turning on LEDs of the same overhead sidelight, which LEDs are side-directed towards a second edge of the web when looking at the sidelight from the direction whereto the paper or cardboard web runs for illuminating a second half of width of the web from center to the second edge of the web for capturing an image of the second half of width of the web by at least one imaging device; and turning off the LEDs that are side-directed towards the second edge of the web;

wherein the method further comprises: transmitting image data of the captured wherein the method further comprises: analysing the image data that is captured when the web is illuminated by the sidelight by using a sidelight type of monitoring profile; and, wherein the method further comprises: analysing the image data that is captured when the web is illuminated by the transmission light by using a transmission type of monitoring profile, wherein the sidelight type of monitoring profile and the transmission type of monitoring profile profiles have different parameters for monitoring.

6. An overhead sidelight arranged to be positioned over a paper or cardboard web for illuminating the web for imaging, comprising:

a plurality of LEDs; and an elongated body arranged to support the LEDs, wherein the length of the elongated body is shorter or equal length than the width of the web, and wherein a first part of the LEDs is side-directed towards a first edge of the web when looking at the sidelight from the direction whereto the paper or cardboard web runs for illuminating a first half of width of the web from center to the first edge of the web as a first part of the rectangular area, and wherein a second part of the LEDs is side-directed towards a second edge of the web when looking at the sidelight from the direction whereto the paper or cardboard web runs for illuminating a second half of width of the web from center to the second edge of the web as a second part of the rectangular area, and wherein the first and second part of the LEDs are on and off alternately, and wherein the width of the overhead sidelight is shorter than a width of the web or as wide as the web.

7. The overhead sidelight according to claim 6, wherein the first part of the LEDs is arranged in the first half of the elongated body and the second part of the LEDs are arranged in the second half of the elongated body so that the center part of the elongated body comprises both the first and second part of the LEDs.

8. The overhead sidelight according to claim 7, wherein in the center part every other LED is side-directed towards the first edge of the web and every other is side-directed towards the second edge of the web.

9. A lighting system for illuminating a paper or cardboard web for deviation detecting from the web, wherein the lighting system comprises:

an elongated transmission light arranged to be positioned under the web perpendicular to the longitudinal direction of the web, and an elongated overhead sidelight according to claim 6, which overhead sidelight is arranged to be positioned over the web, perpendicular to the longitudinal direction of the web for illuminating a rectangular area on the surface of the web for image capturing in two parts, wherein a first part is illuminated when only the first part of LEDs that are side-directed towards the first edge of the web are on, and a second part is illuminated when only the second part of LEDs that are side-directed towards the second edge of the web are on, and which elongated transmission light is arranged to illuminate the same area as the overhead sidelight, but through the web, and wherein the transmission light is arranged to be on, when the LEDs of the sidelight are turned off, for image capturing of the web by the at least one imaging device.

10. The lighting system according to claim 9, wherein turning on and off of LEDs is controlled by a lighting control unit by electric pulses through LED drivers of the LEDs.

11. A machine vision system for detecting deviations from a paper or cardboard web, wherein the machine vision system comprises:

at least one imaging device, and an overhead sidelight according to claim 6, wherein when the first part of the LEDs is side-directed towards the first edge of the web are turned on and the second part of the LEDs is turned off, an image of the first half of width of the web is arranged to be captured by the at least one imaging device, and wherein when the second part of the LEDs that are side-directed towards the second edge of the web is turned on and the first part of the LEDs is turned off, an image of the second half of width of the web is arranged to be captured by the at least one imaging device.

12. The machine vision system according to claim 11, wherein the system further comprises a transmission light arranged to be positioned under the web for illuminating the same area as the overhead sidelight, through the web, and wherein the transmission light is turned on, when the LEDs of the sidelight are turned off, and at least one image of the web is arranged to be captured by the at least one imaging device.

13. The machine vision system according to cairn 11, wherein the at least one imaging device is arranged to transmit image data of the captured image to an image data processing device for analysis.

14. A computer program product embodied on a non-transitory computer readable medium, comprising computer program code configured to, when executed on at least one processor, cause a system to perform the method comprising:

turning on LEDs of an overhead sidelight arranged above a paper web, which width of the overhead sidelight is shorter than a width of the web or as wide as the web, and which LEDs are side-directed towards the first edge of the web for illuminating a first half of width of the web from center to the first edge of the web for capturing an image of the first half of width of the web by an imaging device; turning off the LEDs that are side-directed towards the first edge of the web; turning on LEDs of the overhead sidelight, which LEDs are side-directed towards the second edge of the web for illuminating a second half of width of the web from center to the second edge of the web for capturing an image of the second half of width of the web by an imaging device; and turning off the LEDs that are side-directed towards the second edge of the web.

\* \* \* \* \*

UNITED STATES PATENT AND TRADEMARK OFFICE
CERTIFICATE OF CORRECTION

PATENT NO. : 11,128,808 B2  
APPLICATION NO. : 16/701195  
DATED : September 21, 2021  
INVENTOR(S) : Ritoniemi Page 1 of 1

It is certified that error appears in the above-identified patent and that said Letters Patent is hereby corrected as shown below:

In the Claims

Column 13, Claim 5, Line 57, after captured, insert --image to an image data processing device for analysis;--;

Column 16, Claim 14, Line 5, after paper, insert --or cardboard--.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*